United States Patent
Tanaka et al.

(10) Patent No.: US 8,855,327 B2
(45) Date of Patent: Oct. 7, 2014

(54) SOUND EMISSION AND COLLECTION DEVICE AND SOUND EMISSION AND COLLECTION METHOD

(75) Inventors: Ryo Tanaka, Hamamatsu (JP); Naoto Kuriyama, Hamamatsu (JP)

(73) Assignee: Yamaha Corporation (JP)

( * ) Notice: Subject to any disclaimer, the term of this patent is extended or adjusted under 35 U.S.C. 154(b) by 584 days.

(21) Appl. No.: 13/127,860

(22) PCT Filed: Nov. 5, 2009

(86) PCT No.: PCT/JP2009/068916
§ 371 (c)(1),
(2), (4) Date: May 5, 2011

(87) PCT Pub. No.: WO2010/053129
PCT Pub. Date: May 14, 2010

(65) Prior Publication Data
US 2011/0211706 A1 Sep. 1, 2011

(30) Foreign Application Priority Data
Nov. 5, 2008 (JP) .................................. 2008-284030

(51) Int. Cl.
*H04B 3/20* (2006.01)
*H04M 9/08* (2006.01)
(Continued)

(52) U.S. Cl.
CPC ...... *H04M 9/082* (2013.01); *G10L 2021/02166* (2013.01); *H04M 1/6008* (2013.01); *G10L 2021/02082* (2013.01)
USPC ................ 381/66; 381/71.1; 381/92; 381/93; 381/94.1; 379/406.01

(58) Field of Classification Search
CPC ........ H04M 9/082; H04M 3/002; H04R 3/02; G10L 2021/02082; G10L 21/02
USPC .......................................................... 381/66
See application file for complete search history.

(56) References Cited

U.S. PATENT DOCUMENTS 7,359,504 B1    4/2008  Reuss et al.
(Continued)

FOREIGN PATENT DOCUMENTS

CN    1953060 A    4/2007
CN    101026659 A   8/2007
(Continued)

OTHER PUBLICATIONS

International Search Report issued in related PCT/JP2009/068916 mailed Dec. 8, 2009.
(Continued)

*Primary Examiner* — Joseph Saunders, Jr.
(74) *Attorney, Agent, or Firm* — Rossi, Kimms & McDowell LLP

(57) ABSTRACT

Provided is a sound emission and collection device capable of estimating the azimuth of a sound source (such as a main utterer) precisely without any processing load. The sound emission and collection device (1) is connected with another sound emission and collection device via a network or the like. The sound emission and collection device (1) receives a sound signal from another sound emission and collection device, as a sound emission signal (FE), and emits the same from a speaker (SP). The sound emission and collection device (1) collects the sound at microphones (MIC1 to MIC3), and produces sound collection beam signals (NE1 to NE3) of different azimuths. The sound emission and collection device down-samples the individual sound collection beam signals (NE1 to NE3), and filters out the echoes of the down-sampled sound collection beam signals (DNE1 to DNE3). The sound emission and collection device selects the sound collection beam signal (DNE1') of the highest signal level from the echo-filtered sound collection beam signals (DNE1' to DNE3'). The sound emission and collection device filters out the echoes of a sound collection beam signal (NE1) from the sound collection azimuth (D1) of the sound collection beam signal (DNE1'), and transmits the same to another sound emission and collection device.

8 Claims, 4 Drawing Sheets

(51) Int. Cl.
    *G10L 21/0216* (2013.01)
    *H04M 1/60* (2006.01)
    *G10L 21/0208* (2013.01)

(56) References Cited

U.S. PATENT DOCUMENTS

| | | | |
|---|---|---|---|
| 2007/0005350 A1 | 1/2007 | Amada | |
| 2007/0206778 A1 | 9/2007 | Matsui | |
| 2007/0263850 A1 | 11/2007 | Stokes et al. | |
| 2008/0273716 A1 | 11/2008 | Saito et al. | |
| 2009/0316923 A1* | 12/2009 | Tashev et al. | 381/66 |

FOREIGN PATENT DOCUMENTS

| | | |
|---|---|---|
| CN | 101203063 A | 6/2008 |
| JP | 2002-238091 A | 8/2002 |
| JP | 2004-343668 A | 12/2004 |
| JP | 2007-010897 A | 1/2007 |
| JP | 2007-013400 A | 1/2007 |
| JP | 2007-166482 A | 6/2007 |
| JP | 2007-181099 A | 7/2007 |
| JP | 2007-235502 A | 9/2007 |
| JP | 2008-092331 A | 4/2008 |
| JP | 2008-177745 A | 7/2008 |
| WO | 2008041878 A2 | 4/2008 |

OTHER PUBLICATIONS

CN OA issued Mar. 27, 2013 for corresponding CN 200980144277.9.

JP OA issued Apr. 9, 2013 for corres. JP 2008-284030.

Extended European Search Report issued Mar. 1, 2013 for corresponding European Patent Application No. 09824828.9.

* cited by examiner

| SOUND COLLECTION AZIMUTH | FILTER COEFFICIENT |
|---|---|
| D1 | — |
| D2 | BBB |
| D3 | — |

SOUND EMISSION AND COLLECTION DEVICE AND SOUND EMISSION AND COLLECTION METHOD

This application is a U.S. National Phase Application of PCT International Application PCT/JP2009/068916 filed on Nov. 5, 2009 which is based on and claims priority from JP 2008-284030 filed Nov. 5, 2008 the contents of which are incorporated herein by reference in their entirety.

TECHNICAL FIELD

The present invention relates to a sound emission and collection device and a sound emission and collection method for collecting sounds of a plurality of azimuths.

BACKGROUND ART

Conventionally, a variety of sound emission and collection devices have been suggested which collect a voice of an utterer and emit the voice based on an input sound emission signal (for example, refer to Patent Document 1).

For instance, the sound emission and collection device described in Patent Document 1 includes a microphone array consisting of a plurality of microphones, performs a delay process and the like for sound signals collected by the respective microphones, and produces a plurality of sound collection beam signals having sound collection directionalities which have different directional axis to each other. The sound emission and collection device selects a sound collection beam signal having the highest signal level from the sound collection beam signals, removes echoes from the selected sound collection beam signal and transmits the sound collection beam signal to another communication party, so that the sound emission and collection device transmits the voice of a main utterer to another communication party.

CITATION LIST

Patent Document

Patent Document 1 JP-A-2004-343668

SUMMARY OF THE INVENTION

Problems to be Solved

However, the sound collection beam signal includes the voice of the utterer and an echo sound based on the sound emitted from its own device. Due to this, the sound emission and collection device cannot precisely select the voice of the main utterer when the echo sound is greater than the voice of the utterer.

In this case, when the sound emission and collection device selects a sound collection beam signal to be transmitted, based on signal levels of the respective echo-removed sound collection beam signals, it can precisely select the voice of the main utterer. However, the process of removing the echoes of all sound collection beam signals (for example, in 6 directions) causes high processing load and it is impossible to actually remove the omnidirectional echoes.

Accordingly, an object of the invention is to provide a sound emission and collection device and a sound emission and collection method capable of precisely selecting a voice of a main utterer without causing any processing load.

Means for Solving the Problems

A sound emission and collection device of the invention produces sound collection signals for different azimuths and estimates an azimuth of a sound source (for example, a main utterer). In addition, the sound emission and collection device includes a first echo cancel section and a plurality of second echo cancel sections. The first echo cancel section removes an echo of the sound collection signal of the estimated azimuth. The second echo cancel sections have configurations simpler than the first echo cancel section and remove echoes from the sound collection signals for the azimuths. The sound emission and collection device estimates the azimuth of the sound source based on signal levels of the sound collection signals subjected to the process in the plurality of second echo cancel sections. In the meantime, the echo cancel section having a simpler configuration is to remove the echo of the down-sampled sound collection signal or to remove the echo with an adaptive filter having the smaller number of taps.

Thereby, since the sound emission and collection device estimates the azimuth of the sound source by using the sound collection signals after simply removing the echoes, it is possible to precisely estimate the azimuth of the sound source without increasing processing load.

In addition, each of the first echo cancel section and the plurality of second echo cancel sections of the sound emission and collection device of the invention has an adaptive filter and a filter coefficient estimation section that estimates a filter coefficient of the adaptive filter. The filter coefficient estimation section of the first echo cancel section performs a process of updating a filter coefficient while using, as an initial value, a filter coefficient of the second echo cancel section having removed the echo of the sound collection signal of the estimated azimuth of the sound source.

Thereby, since the sound emission and collection device can remove the echo of the sound collection signal of the azimuth of the sound source by using, as an initial value, the filter coefficient used in estimating the azimuth of the sound source, it is possible to shorten the time necessary for estimation of the filter coefficient. Accordingly, the sound emission and collection device can remove the echoes from the initial state.

In addition, the first echo cancel section of the sound emission and collection device of the invention stores the filter coefficients of the adaptive filter for respective azimuths. Only when the filter coefficient is not stored, the filter coefficient estimation section of the first echo cancel section performs the initialization process of initializing a filter coefficient to the filter coefficient of the second echo cancel section, as described above.

Thereby, only when the filter coefficient is not stored in a storage section, the first echo cancel section of the sound emission and collection device initializes the filter coefficient used in estimating the azimuth of the sound source and initializes the filter coefficient that has been previously used, for the other cases. Accordingly, it is possible to immediately remove the echoes even when the environment (for example, utterer) is changed.

In addition, the invention provides a sound emission and collection method including a process of emitting a sound; a process of collecting sounds of a plurality of azimuths and producing sound collection signals for the azimuths; a second echo removing process of removing echoes from the sound collection signals of the azimuths, respectively; a process of estimating an azimuth of the sound source based on signal levels of the sound collection signals for the azimuths for which the echo removing process has been performed by the second echo removing process; and a first echo removing process of removing the echoes from the sound collection signal from the azimuth of the sound source estimated in the azimuth estimating process.

Preferably, the method further includes a process of downsampling the sound collection signals for the azimuths produced in the sound collecting process. In the second echo removing process, the echoes are removed from the downsampled sound collection signals for the azimuths.

Advantageous Effects of Invention

The sound emission and collection device of the invention can precisely estimate the azimuth of the sound source (for example, main utterer) without increasing processing load.

DETAILED DESCRIPTION OF EXEMPLARY EMBODIMENTS

A sound emission and collection device 1 according to an embodiment of the invention will be described with reference to FIGS. 1 to 4. The sound emission and collection device 1 is connected to another sound emission and collection device via a network and the like. The sound emission and collection device 1 receives a sound signal from another sound emission and collection device, as a sound emission signal, and emits the same from a speaker SP. In addition, the sound emission and collection device 1 collects the sound at microphones MIC1 to MIC3 and produces sound collection beam signals of a plurality of azimuths. The sound emission and collection device 1 transmits a sound collection beam signal from the azimuth of a main utterer to another sound emission and collection device.

Figure 1:
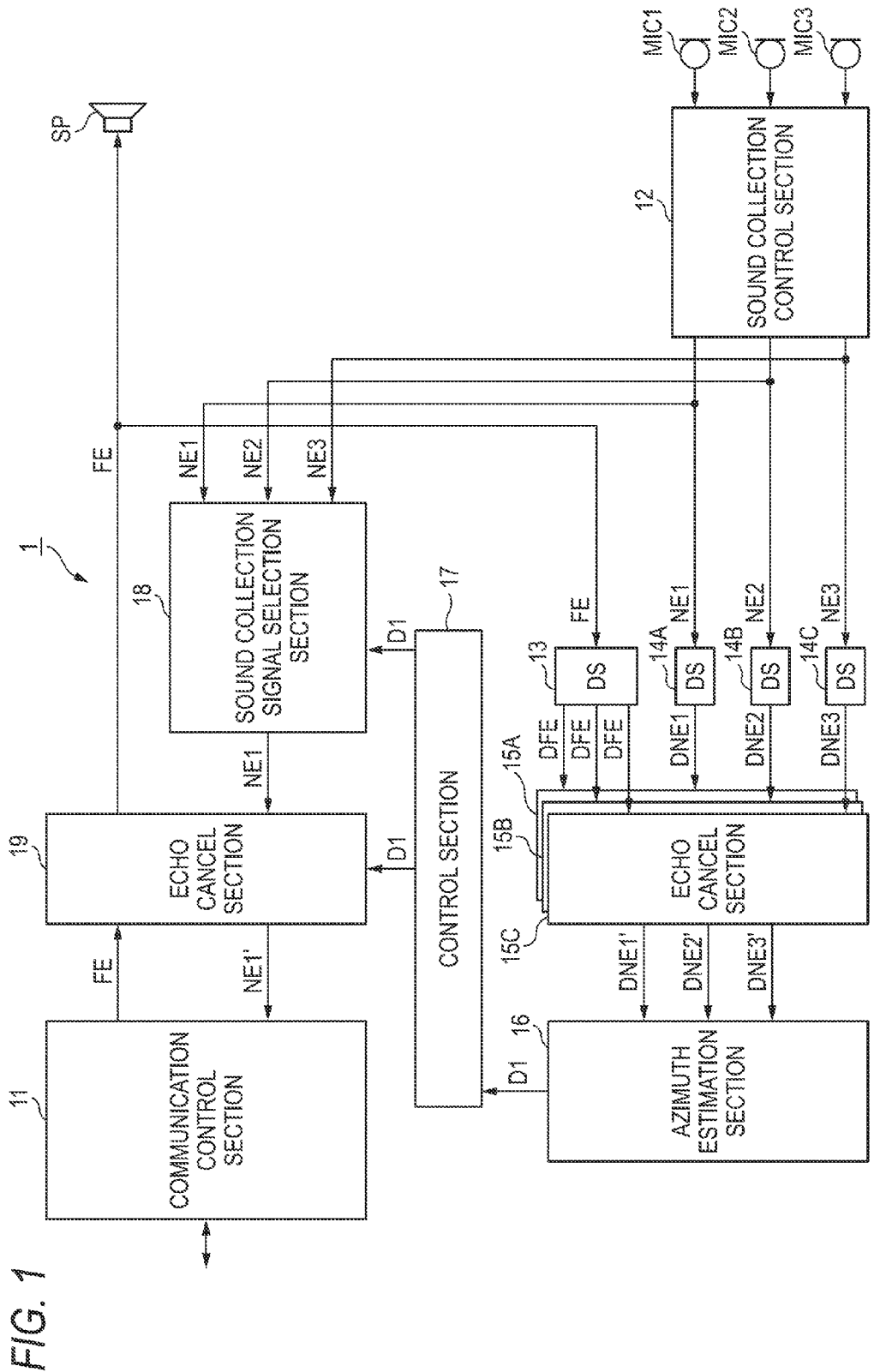
FIG. 1 is a block diagram showing functions and configurations of a sound emission and collection device.
Figure 2:
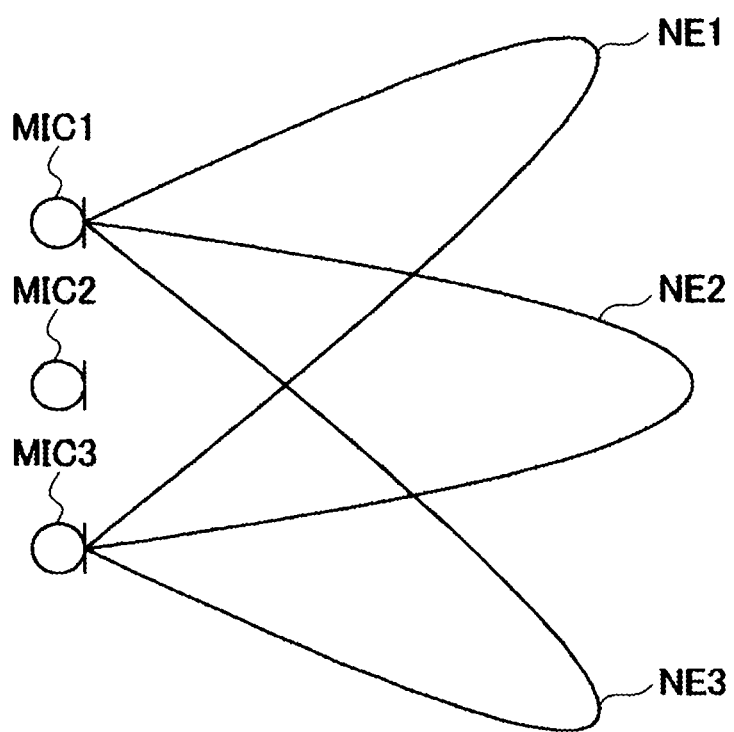
FIG. 2 illustrates sound collection azimuths of respective sound collection beam signals.

First, functions and configurations of the sound emission and collection device 1 will be described with reference to FIGS. 1 and 2. FIG. 1 is a block diagram showing functions and configurations of the sound emission and collection device. FIG. 2 illustrates sound collection azimuths of respective sound collection beam signals. The sound emission and collection device 1 includes a speaker SP, microphones MIC1 to MIC3, a communication control section 11, a sound collection control section 12, a down-sampling section (hereinafter, referred to as DS section) 13, down-sampling sections (hereinafter, referred to as DS sections) 14A to 14C, echo cancel sections (second echo cancel sections) 15A to 15C, an azimuth estimation section 16, a control section 17, a sound collection signal selection section 18 and an echo cancel section (first echo cancel section) 19.

The communication control section 11 is connected to another sound emission and collection device via a network and controls the communication with another sound emission and collection device. Specifically, the communication control section 11 receives a sound emission signal FE from another sound emission and collection device and outputs the same to the DS section 13 and the speaker SP, which will be described later, via the echo cancel section 19. The speaker SP emits a sound based on the sound emission signal FE. In addition, the communication control section 11 transmits a sound collection beam signal NE1', which is input from the echo cancel section 19 (which will be described below), to another sound emission and collection device.

The microphones MIC1 to MIC3 collect surrounding sounds, produce sound collection signals, respectively, and output the sound collection signals to the sound collection control section 12. In the meantime, the number of the microphones is not limited to three.

The sound collection control section 12 performs a delay process and the like for the sound collection signals from the respective microphones MIC1 to MIC3 and thus produces a plurality of sound collection beam signals NE1 to NE3 having different azimuths respectively as central directions of sound collection directionalities, as shown in FIG. 2. The respective sound collection azimuths of the sound collection beam signals NE1 to NE3 are indicated with D1 to D3.

The sound collection control section 12 outputs the sound collection beam signals NE1 to NE3 to the DS sections 14A to 14C, respectively, and to the sound collection signal selection section 18. The number of the sound collection beam signals produced by the sound collection control section 12 is not limited to three. Also, the sound collection control section 12 is not an indispensable element for the embodiment. In this case, the respective microphones MIC1 to MIC3 collect the sounds of the different azimuths, produce the sound collection signals, and output the sound collection signals to the DS sections 14A to 14C and to the sound collection signal selection section 18.

The DS sections 14A to 14C include low-pass filters, down-sample the input sound collection beams signals NE1 to NE3, respectively, and output the down-sampled sound collection beam signals DNE1 to DNE3 to the echo cancel sections 15A to 15C, respectively. For example, the DS sections 14A to 14C down-sample the sound collection beam signals NE1 to NE3, which are sampled at a sampling frequency of 20 kHz, to signals having a sampling frequency of 10 kHz.

The DS section 13 includes a low-pass filter, down-samples the input sound emission signal FE and outputs the down-sampled sound emission signals DFE to the echo cancel sections 15A to 15C. For example, the DS section 13 down-samples the sound emission signal FE, which is sampled at a sampling frequency of 20 kHz, to a signal having a sampling frequency of 10 kHz.

The echo cancel sections 15A to 15C produce pseudo echo sound signals, which are pseudo signals of an echo component reaching the respective microphones MIC1 to MIC3 from the speaker SP, based on the down-sampled sound emission signals DFE. The echo cancel sections 15A to 15C subtract the pseudo echo sound signals from the down-sampled sound collection beam signals DNE1 to DNE3, respectively, thereby removing the echoes. Then, the echo cancel sections 15A to 15C output the sound collection beam signals DNE1' to DNE3' after the echoes have been removed.

The echo cancel sections 15A to 15C are to remove the echoes of the down-sampled sound collection beam signals DNE1 to DNE3, so that the echo cancel sections 15A to 15C have a simpler configuration than the echo cancel section 19 (the echo cancel sections 15A to 15C have a configuration having a lower processing capability than that of the echo cancel section 19) and can thus remove the echoes without increasing the processing load. In addition, the echo cancel sections 15A to 15C may have the number of taps smaller than that of the echo cancel section 19. In the meantime, the specific functions and configurations of the echo cancel sections 15A to 15C will be described later.

The azimuth estimation section 16 selects a sound collection beam signal having the highest signal level from the sound collection beam signals DNE1' to DNE3' after the echo cancellation. In the below, a case will be described in which the azimuth estimation section 16 selects, as a sound collection beam signal having the highest signal level, the sound collection beam signal DNE1' based on the sound collection azimuth D1. The azimuth estimation section 16 acquires the sound collection azimuth D1 of the selected sound collection beam signal DNE1' and outputs the sound collection azimuth D1 to the control section 17.

The control section 17 controls the sound collection signal selection section 18 and the echo cancel section 19, based on the sound collection azimuth D1 input from the azimuth estimation section 16.

The sound collection signal selection section 18 selects the sound collection beam signal NE1, based on the sound collection azimuth D1 input from the control section 17, among the sound collection beam signals NE1 to NE3 input from the sound collection control section 12, and outputs the sound collection beam signal NE1 to the echo cancel section 19.

The echo cancel section 19 produces a pseudo echo sound signal, which is a pseudo signal of an echo component reaching the respective microphones MIC1 to MIC3 from the speaker SP, based on the sound emission signal FE, and subtracts the pseudo echo sound signal from the sound collection beam signal NE1 input from the sound collection signal selection section 18, thereby removing the echoes. Then, the echo cancel section 19 outputs the sound collection beam signal NE1' after the echoes have been removed to the communication control section 11. In the meantime, the specific functions and configurations of the echo cancel section 19 will be described below.

As described above, since the echo cancel sections 15A to 15C remove the echoes of the down-sampled sound collection beam signals DNE1 to DNE3, it is possible to reduce the processing load. In addition, since the sound emission and collection device 1 acquires the azimuth of the main utterer by using the sound collection beam signals DNE1' to DNE3' after the echoes have been removed and selects the sound collection beam signal from the azimuth of the main utterer, it is possible to precisely select the voice of the main utterer. Accordingly, the sound emission and collection device 1 can precisely select the voice of the main utterer without increasing the processing load.

Figures 3, 4:
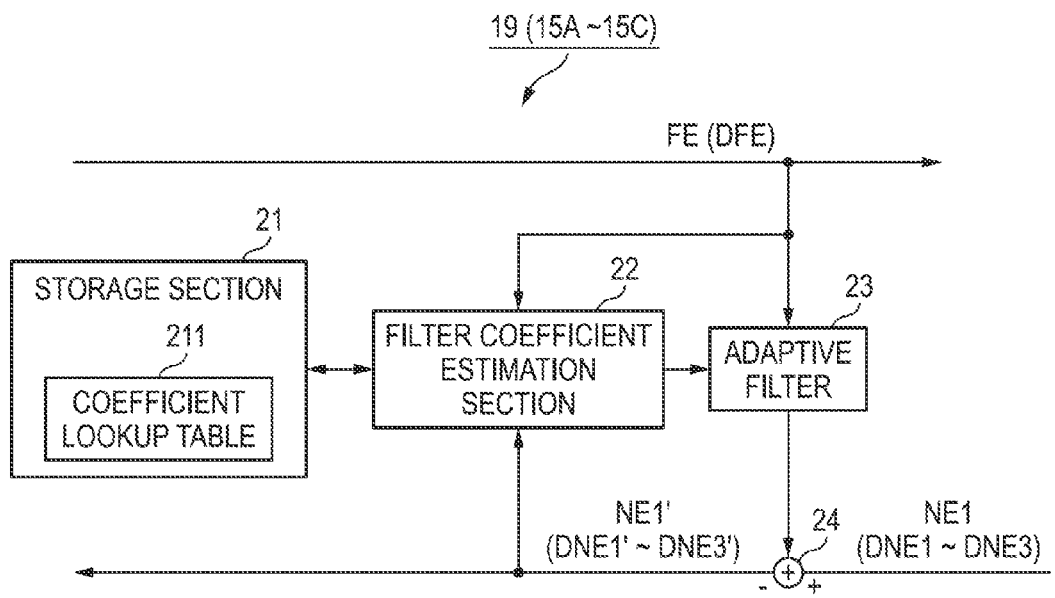
FIG. 3 is a block diagram showing functions and configurations of an echo cancel section.
FIG. 4 is a view showing examples of filter coefficients of respective sound collection azimuths of an adaptive filter.

In the followings, the functions and configurations of the echo cancel sections 15A to 15C and the echo cancel section 19 will be specifically described with reference to FIGS. 3 and 4. FIG. 3 is a block diagram showing functions and configurations of an echo cancel section. FIG. 4 is a view showing examples of filter coefficients of respective sound collection azimuths of an adaptive filter. The echo cancel sections 15A to 15C and the echo cancel section 19 have the same functions and configurations. In the below, the echo cancel section 19 will be exemplified.

As shown in FIG. 3, the echo cancel section 19 has a storage section 21, a filter coefficient estimation section 22, an adaptive filter 23 and an adder section 24.

The storage section 21 temporarily stores a coefficient lookup table 211 shown in FIG. 4 therein. The coefficient lookup table 211 has filter coefficients for each of the sound collection azimuths and is referred to by the filter coefficient estimation section 22. In the meantime, the filter coefficients stored in the coefficient lookup table 211 are reset as the power source of the sound emission and collection device 1 is turned on or off.

The filter coefficient estimation section 22 estimates a transfer function of an acoustic transfer system (an acoustic propagation route from the speaker SP to the respective microphones MIC1 to MIC3) and sets a filter coefficient of an FIR filter by the estimated transfer function. At this time, the filter coefficient estimation section 22 acquires a filter coefficient corresponding to the sound collection azimuth D1 input from the control section 17 from the coefficient lookup table 211 and calculates a filter coefficient while using the acquired filter coefficient as an initial value. In addition, the filter coefficient estimation section 22 updates the filter coefficient by using an adaptive algorithm, based on the sound collection beam signal NE1' output from the adder section 24 and the sound emission signal FE. Then, the filter coefficient estimation section 22 outputs the calculated filter coefficient to the adaptive filter 23.

The adaptive filter 23 includes a digital filter such as FIR filter and the like and produces a pseudo echo sound signal by the filter coefficient input from the filter coefficient estimation section 22. The adaptive filter 23 outputs the produced pseudo echo sound signal to the adder section 24.

The adder section 24 outputs the sound collection beam signal NE1' obtained by subtracting the pseudo echo sound signal input from the adaptive filter 23 from the sound collection beam signal NE1.

In the meantime, the storage section 21 is not an indispensable element for the embodiment. However, since the echo cancel section 19 should change the initial value of the filter coefficient when the sound collection azimuth is changed, it is preferable to provide the storage section 21.

In addition, the filter coefficient estimation sections 22 of the echo cancel sections 15A to 15C update the filter coefficients by using the adaptive algorithm, based on the sound collection beam signals DNE1' to DNE3' output from the adder sections 24 and the down-sampled sound emission signals DFE, respectively.

As described above, the echo cancel section 19 stores the filter coefficients for each of the sound collection azimuths in the storage section 21. Thus, although the environment (utterer) is changed when the sound collection azimuth is changed, the echo cancel section estimates the adaptive filter by acquiring the filter coefficient, which has been already adapted, from the storage section 21. Accordingly, the echo cancel section 19 can shorten a time for the estimation of the adaptive filter and thus remove the echoes immediately even when the environment (utterer) is changed.

Figure 5:
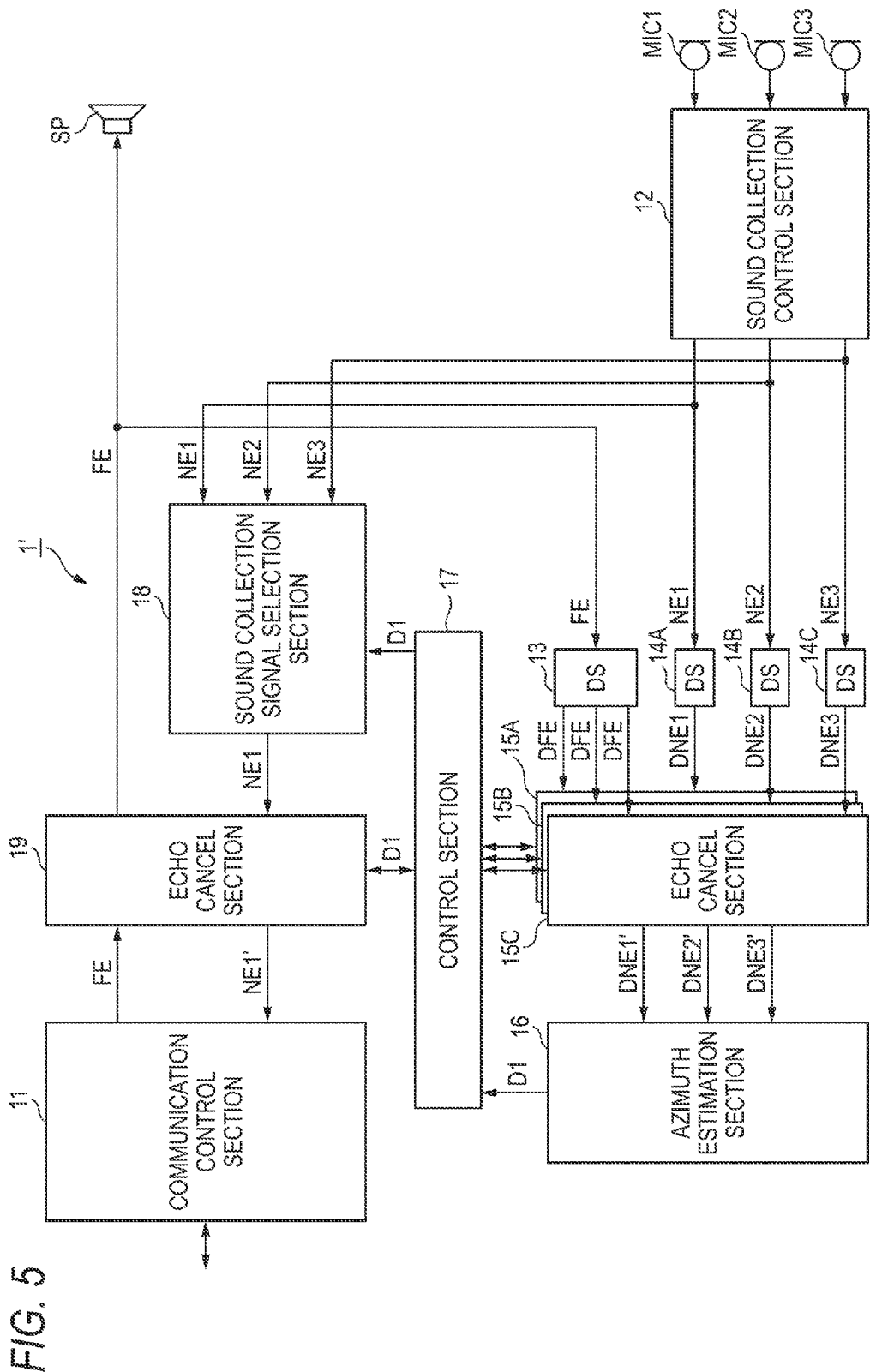
FIG. 5 is a block diagram showing functions and configurations of a sound emission and collection device according to another embodiment.

In the meantime, the echo cancel section 19 may perform the echo cancellation by using the filter coefficients acquired from the echo cancel sections 15A to 15C. In this case, the filter coefficients of the echo cancel sections 15A to 15C are up-sampled and used. FIG. 5 is a block diagram showing functions and configurations of a sound emission and collection device according to another embodiment. As shown in FIG. 5, the control section 17 refers to the coefficient lookup table 211 of the storage section 21 of the echo cancel section 19 when the power source of the sound emission and collection device 1 is turned on or when the sound collection azimuth is changed. Only when the filter coefficient of the sound collection azimuth input from the azimuth estimation section 16 is not stored in the coefficient lookup table 211, the control section 17 acquires filter coefficients from the echo cancel sections 15A to 15C having removed the echoes of the sound collection beam signals from the sound collection azimuths, and outputs the same to the filter coefficient estimation section 22 of the echo cancel section 19. Then, the filter coefficient estimation section 22 calculates a filter coefficient by using the filter coefficient input from the control section 17 as an initial value. Thereby, since the echo cancel section 19 calculates the filter coefficient while using, as an initial value, the filter coefficient used when the echoes of the down-sampled sound collection beam signals DNE1 to DNE3 are removed, it is possible to shorten the estimation time of the filter coefficient. Accordingly, the echo cancel section 19 can remove the echoes from the initial state.

Although the invention has been specifically described with reference to the specific illustrative embodiments, it is apparent that one skilled in the art can variously change and modify the illustrative embodiments without departing from the spirit, scope and intention of the invention.

The present application claims priority from Japanese Patent Application Number 2008-284030 filed on Nov. 5, 2008, the entire contents of which are incorporated herein by reference.

INDUSTRIAL APPLICABILITY

The invention can provide the sound emission and collection device capable of precisely estimating the azimuth of the sound source (for example, main utterer) without processing load.

DESCRIPTIONS OF REFERENCE NUMERALS

1: sound emission and collection device
11: communication control section
12: sound collection control section
13, 14: DS section
15, 19: echo cancel section
16: azimuth estimation section
17: control section
18: sound collection signal selection section
21: storage section
211: coefficient lookup table
22: filter coefficient estimation section
23: adaptive filter
24: adder section
MIC1 to MIC3: microphone
SP: speaker

The invention claimed is:

1. A sound emission and collection device comprising:
a sound collection section that collects sounds of a plurality of azimuths and produces sound collection signals for the azimuths respectively;
a sound emission section that emits a sound;
an azimuth estimation section that estimates an azimuth of a sound source based on signal levels of the sound collection signals for the azimuths respectively;
a first echo cancel section that removes an echo of the sound collection signal from the azimuth of the sound source estimated by the azimuth estimation section; and
a plurality of second echo cancel sections that remove echoes of the sound collection signals for the azimuths respectively,
wherein the plurality of second echo cancel sections each process a smaller load than that of the first echo cancel section, and
wherein the azimuth estimation section estimates the azimuth of the sound source based on signal levels of the sound collection signals having been subjected to an echo removal by the second echo cancel section.

2. The sound emission and collection device according to claim 1, wherein:
each of the first echo cancel section and the plurality of second echo cancel sections has an adaptive filter and a filter coefficient estimation section for estimating a filter coefficient of the adaptive filter, and
the filter coefficient estimation section of the first echo cancel section performs an initialization process of initializing to an initial value which is a filter coefficient of the adaptive filter of the second echo cancel section having removed the echo of the sound collection signal of the azimuth estimated by the azimuth estimation section.

3. The sound emission and collection device according to claim 2, wherein:
the first echo cancel section includes a storage section which stores therein filter coefficients of the adaptive filter for the azimuths respectively, and
the filter coefficient estimation section of the first echo cancel section performs the initialization process only when the filter coefficients are not stored in the storage section.

4. The sound emission and collection device according to claim 1, further comprising:
down-sampling sections that are provided at preceding stages of the plurality of second echo cancel section,
wherein the down-sampling sections down-sample the sound collection signals for the azimuths respectively which are output from the sound collection section, and output the down-sampled sound collection signals for the azimuths to the plurality of second echo cancel section.

5. The sound emission and collection device according to claim 1, wherein:
the first echo cancel section and the plurality of second echo cancel sections have adaptive filters respectively, and
each of the adaptive filters of the plurality of second echo cancel sections has the number of taps smaller than that of the first echo cancel section.

6. The sound emission and collection device according to claim 1, wherein the plurality of second echo cancel sections have a smaller number of taps than that of the first echo cancel section.

7. A sound emission and collection method comprising:
a sound emitting step of emitting a sound with a sound emission section;
a sound collecting step of collecting sounds of a plurality of azimuths and producing sound collection signals for the azimuths with a sound collection section;
an azimuth estimation step of estimating, with an azimuth estimation section, an azimuth of a sound source based on signal levels of the sound collection signals for the azimuths, respectively;
a first echo removing step of removing, with a first echo cancel section, an echo of the sound collection signal from the azimuth of the sound source estimated in the azimuth estimation step;
a second echo removing step of removing, with a plurality of second echo cancel sections, echoes of the sound collection signals for the azimuths respectively,
wherein the plurality of second echo cancel sections each process a smaller load than that of the first echo cancel section in the second echo removing step, and
wherein the azimuth estimation step estimates the azimuth of the sound source based on signal levels of the sound collection signals having been subjected to the second echo removing step.

8. The sound emission and collection method according to claim 7, further comprising:
- a process of down-sampling the sound collection signals for the azimuths produced in the sound collecting process,
- wherein in the second echo removing process, the echoes are removed from the down-sampled sound collection signals for the azimuths.

\* \* \* \* \*